No. 759,068. PATENTED MAY 3, 1904.
W. C. BLACK.
SEPARATOR SIEVE.
APPLICATION FILED NOV. 4, 1903.
NO MODEL. 2 SHEETS—SHEET 1.

Witnesses
Inventor
William C. Black
by John H. Cadd.
his Attorney

No. 759,068. PATENTED MAY 3, 1904.
W. C. BLACK.
SEPARATOR SIEVE.
APPLICATION FILED NOV. 4, 1903.
NO MODEL. 2 SHEETS—SHEET 2.
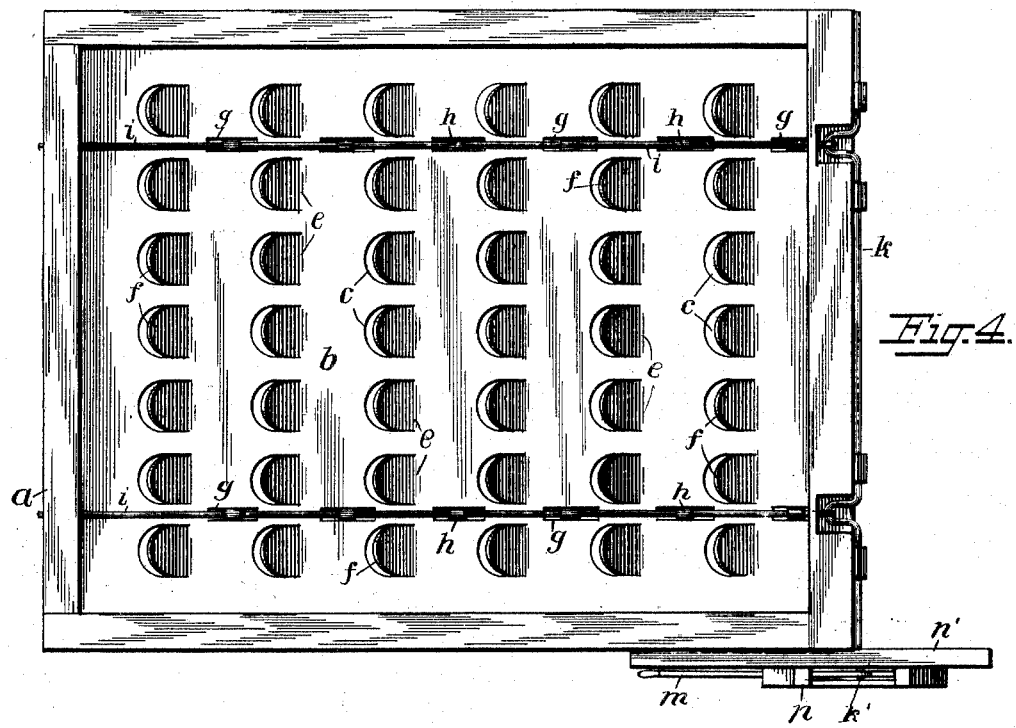
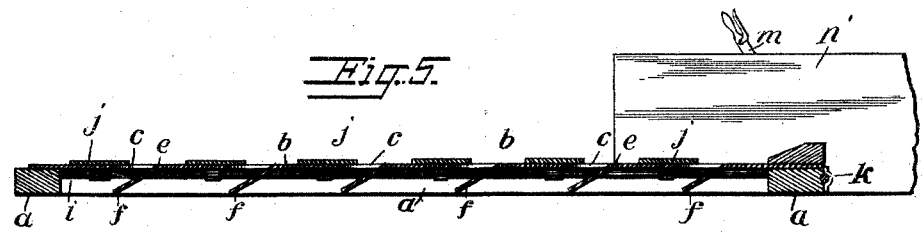
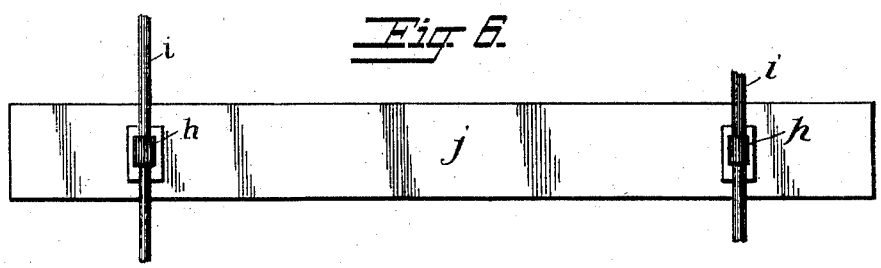
Witnesses
Inventor
William C. Black
by John H. Caro
his Attorney No. 759,068.                                              Patented May 3, 1904.

UNITED STATES PATENT OFFICE.

WILLIAM C. BLACK, OF PLYMOUTH, OHIO.

SEPARATOR-SIEVE.

SPECIFICATION forming part of Letters Patent No. 759,068, dated May 3, 1904.

Application filed November 4, 1903. Serial No. 179,818. (No model.)

*To all whom it may concern:*

Be it known that I, WILLIAM C. BLACK, a citizen of the United States of America, and a resident of Plymouth, county of Richland, and State of Ohio, have invented certain new and useful Improvements in Separator-Sieves, of which the following is a specification.

My invention relates to sieves for separators, and is used to perform the final function of separating the grain from the chaff.

The object of my improvement is to construct a sieve in such a manner as to present a broken inclined surface in the direction of the blast which will remain at the same inclination irrespective of the adjustment of the slats varying the openings in the sieve.

A further object is to afford facilities for varying the openings in the surface of the sieve, thereby providing a means of cleaning all kinds of grain.

I attain these and other objects by the mechanism illustrated in the accompanying drawings, in which—

Figure 1:
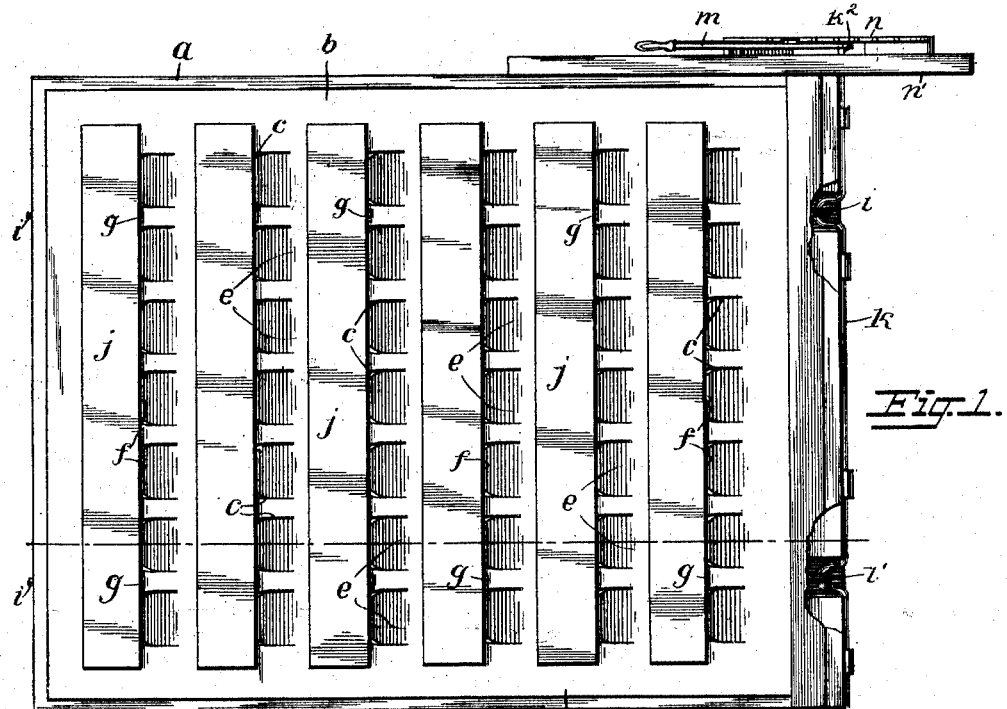
Figure 3:
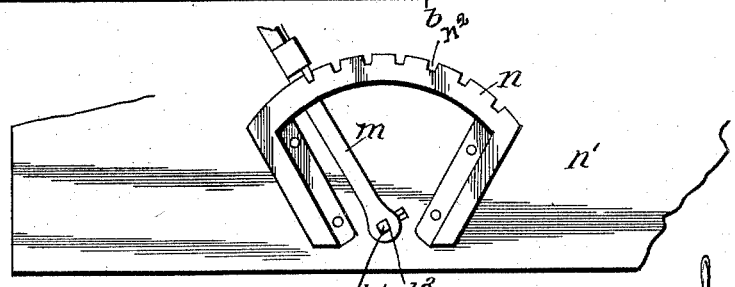
Figure 2:
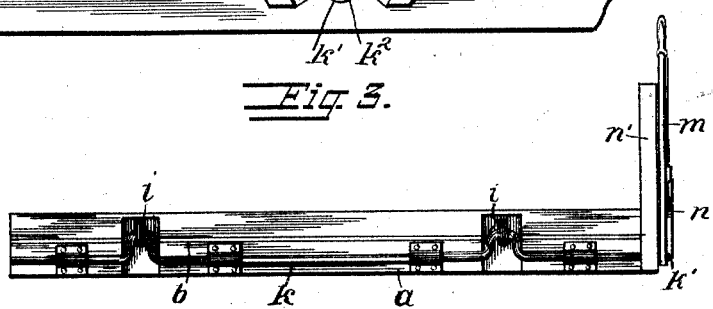

Figure 1 is a top plan view showing the sieve partly open. Fig. 2 is an end view of Fig. 1, showing crank-shaft and lever connected to the draw-bars which are attached to the slats for the purpose of adjustment. Fig. 3 is a side view of the ratchet-bar. Fig. 4 is a bottom view of the sieve, showing the slats attached to the draw-bars. Fig. 5 is a side view of the surface of the sieve, showing the depending lips. Fig. 6 is a top view of one of the slats, showing slots cut in each side thereof, providing a means of adjusting the slats whereby the openings in the surface of the sieve are varied.

In constructing my device I provide a rectangular frame $a$, upon which I mount and securely attach a sieve $b$, having a series of openings $c$ in the surface. The openings in the surface of the sieve are made by cutting apertures therein, as shown in the drawings. At regular intervals and in direct alinement with each other a series of apertures are provided by cutting the surface of the sieve at regular intervals in such a manner as to leave one end $e$ of the partion cut out integral with the surface. This portion is pressed downward on an incline in the direction of the blast, providing a series of depending lips $f$, as shown in Fig. 5.

A series of slots $g$ are provided in the surface of the sieve, through which the lugs $h$ pass, these lugs being securely attached to the draw-bars $i$. The upper portion of the lugs are securely fastened to a series of slats $j$. A crank-shaft $k$ is journaled to the end of the frame and adapted to connect with the draw-bars. One end $k'$ of the crank-shaft is preferably made rectangular in form, corresponding with a suitable aperture $k^2$ provided in one end of a lever $m$. This provides a means of reciprocating the slats upon the surface of the sieve, varying the openings or apertures in the surface, thereby affording facilities for separating all kinds of grain irrespective of its condition, size, or kind. It will be noted that the construction described provides a means of adjusting the mesh of the sieve without changing the inclined plane formed by the depending lips. In order to keep the sieve in proper adjustment, a segment ratchet-bar $n$ is attached by any suitable means to the shoe $n'$. The lever is provided with means adapted to engage the notches $n^2$ of the ratchet-bar and retain the slats at any point of their adjustment.

It will be noted that the strain of operating mechanism which provides for adjustment is equalized by the construction described, as two or more draw-bars can be used to adjust the slats.

Slight changes or modifications can be made without deviating from my invention.

Having fully described my invention, what I claim, and desire to secure by Letters Patent, is—

1. A screen for separators comprising a frame, a sieve secured thereupon, lips struck from the surface of the sieve, the sieve provided with apertures formed therein by the lips struck from its surface and having slots formed in the surface of the sieve, a series of slats located adjacent the apertures, lugs secured to the slats and received in the slots, draw-bars to which the lugs are attached, and a movable crank-shaft with which the draw-bars are connected to permit an adjustment of the mesh of the sieve by the reciprocation of the slats.

2. A screen for separators comprising a suitably-supported plate, inclined depending lips projecting from the surface thereof, the plate provided with apertures formed therein by the projection of the lips, slats mounted upon the plate, lugs carried by the slats, a draw-bar to which the lugs are secured, a crank-shaft journaled on the end of the support for the plate, the draw-bar connected to the shaft, a lever secured to the crank-shaft, a shoe, a segment ratchet-bar secured thereto, and means on the lever meshing with the segment to retain the slats in any adjusted position.

3. A screen for separators comprising a suitable frame, a perforated plate stationarily mounted thereon, a series of imperforate slats received upon the plate the slats formed independently of one another, and means connected with the slats for moving them to adjust the mesh of the screen.

4. A screen for separators comprising a suitable frame, a perforated plate mounted thereon and having slots formed therein, a series of slats received upon the plate the slats formed independently of one another, lugs carried by each of the slats and extending through the slots in the plate and means connecting the lugs for moving the slats to adjust the mesh of the screen.

5. A screen for separators comprising a suitable frame, a perforated plate mounted thereon, a series of independent slats received and movable upon the plate, a bar to which each of the independent slats is connected, a crank-shaft to which the bar is connected and adjustable means connected with the crank-shaft for operating the slats.

6. The combination with a suitable frame, of a perforated sieve secured to the frame, a plurality of lips depending from the sieve, a series of independent slats adapted to regulate the size of the sieve-perforations, longitudinally-extending rods connecting the slats in series, a crank-shaft journaled on the frame, the rods secured to the crank-shaft and means for adjusting the slats through the crank-shaft.

7. The combination with a frame, of a perforated sieve, lips depending therefrom, a plurality of independent slats on the sieve, longitudinal rods adapted to connect the slats in series, a crank-shaft journaled on the frame, the rods secured to the crank-shaft and means for adjusting the slats to regulate the mesh of the sieve.

8. The combination with a frame having a perforated sieve mounted thereon, of a plurality of slats adapted to be reciprocated upon the sieve for varying the mesh thereof, longitudinal rods connecting the independent slats in series, an eye formed at one end of each rod, a shaft journaled on the frame, cranks formed on the shaft, the eyes connected with the cranks and means for operating the crank-shaft to adjust the slats.

Signed at Mansfield, Ohio, this 12th day of October, 1903.

WILLIAM C. BLACK.

Witnesses:
JOHN H. COSS,
EDITH CLINE.